United States Patent
Escudero Rodriguez et al.

(10) Patent No.: US 10,903,748 B2
(45) Date of Patent: Jan. 26, 2021

(54) FREQUENCY MODULATION CONTROL FOR PHASE-SHIFT FULL BRIDGE CONVERTERS

(71) Applicant: Infineon Technologies Austria AG, Villach (AT)

(72) Inventors: Manuel Escudero Rodriguez, Villach (AT); Matteo-Alessandro Kutschak, Ludmannsdorf (AT)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/362,138

(22) Filed: Mar. 22, 2019

(65) Prior Publication Data

US 2020/0304033 A1    Sep. 24, 2020

(51) Int. Cl.
H02M 3/335 (2006.01)
H02M 7/5387 (2007.01)
H02M 1/00 (2006.01)

(52) U.S. Cl.
CPC .... H02M 3/33569 (2013.01); *H02M 3/33576* (2013.01); *H02M 2001/007* (2013.01); *H02M 2001/0058* (2013.01); *H02M 2001/0096* (2013.01); *H02M 2007/53878* (2013.01)

(58) Field of Classification Search
CPC ..... H02M 2001/0096; H02M 3/33576; H02M 3/33584; H02M 2001/0058; H02M 3/33569; H02M 2007/53878
See application file for complete search history.

(56) References Cited

U.S. PATENT DOCUMENTS

| | | | | |
|---|---|---|---|---|
| 5,764,495 A | * | 6/1998 | Faulk | H02M 3/33507 323/303 |
| 2008/0259645 A1 | * | 10/2008 | Herty | H02M 7/53871 363/17 |
| 2010/0246225 A1 | | 9/2010 | Moon et al. | |
| 2013/0039104 A1 | * | 2/2013 | Sharma | H02M 1/10 363/123 |
| 2014/0198536 A1 | | 7/2014 | Fu et al. | |
| 2015/0062971 A1 | | 3/2015 | Ye et al. | |
| 2015/0070954 A1 | | 3/2015 | Huang et al. | |
| 2015/0103562 A1 | * | 4/2015 | Yeh | H02M 3/3353 363/17 |

(Continued)

*Primary Examiner* — Fred E Finch, III
(74) *Attorney, Agent, or Firm* — Murphy, Bilak & Homilier, PLLC

(57) ABSTRACT

A phase shift full bridge (PSFB) converter includes: an isolation transformer; a full-bridge having a first pair of switch devices connected in series at a first node coupled to a first terminal of the primary side of the isolation transformer, and a second pair of switch devices connected in series at a second node coupled to a second terminal of the primary side of the isolation transformer; a rectifier coupled to the secondary side of the isolation transformer; and a controller for switching the first and second pairs of switch devices out of phase with each other. Under nominal input voltage conditions for the PSFB, the controller switches the first and second pairs of switch devices at a nominal switching frequency. Under reduced input voltage conditions for the PSFB, the controller switches the first and second pairs of switch devices at a frequency lower than the nominal switching frequency.

23 Claims, 13 Drawing Sheets

(56) References Cited

U.S. PATENT DOCUMENTS

| | | | |
|---|---|---|---|
| 2015/0115901 A1* | 4/2015 | Zhang | H02M 1/32 320/166 |
| 2015/0117061 A1 | 4/2015 | Kim et al. | |
| 2015/0207419 A1* | 7/2015 | Kyono | H02M 3/33507 363/17 |
| 2015/0214844 A1* | 7/2015 | Kyono | H02M 3/33507 363/21.02 |
| 2015/0333635 A1* | 11/2015 | Yan | H02M 3/33507 363/17 |
| 2016/0105120 A1* | 4/2016 | Hirano | H02M 3/33561 363/17 |
| 2016/0181925 A1* | 6/2016 | Chiang | H02M 3/33584 363/17 |
| 2018/0034380 A1* | 2/2018 | Chen | H02M 1/32 |
| 2018/0123461 A1 | 5/2018 | Lim et al. | |
| 2018/0166978 A1 | 6/2018 | Lim et al. | |
| 2019/0149086 A1* | 5/2019 | Jin | H02S 40/32 136/244 |

\* cited by examiner

FREQUENCY MODULATION CONTROL FOR PHASE-SHIFT FULL BRIDGE CONVERTERS

BACKGROUND

A phase-shift full bridge (PSFB) converter provides voltage translation in addition to isolation from the AC line voltage input, since the PSFB topology includes an isolation transformer. However, PSFB converters must maintain output voltage regulation during brief interruptions (e.g. 20 ms) in the AC line voltage input. The output voltage of the PSFB converter should not show any modulation or shutdown when the AC line voltage input is briefly interrupted. For example, the nominal DC link voltage to the PSFB converter may be 400V, but during an AC outage, the DC link voltage may drop to about 300V. The PSFB converter must maintain output voltage regulation during the period in which the DC link voltage is depressed.

Conventionally, PSFB converters are designed with a large output capacitor to bridge the time when the AC line voltage is interrupted. However, this means that the PSFB converter has a duty cycle which does not yield optimal efficiency. When the AC line voltage drops, duty cycle increases to maintain regulation. Conventional PSFB converters have maximum duty for minimum AC line voltage conditions to achieve better efficiency. However, this means lower duty under nominal AC line voltage conditions which in turn yields lower efficiency. Operating a PSFB converter with a limited (e.g. 50%) duty cycle during nominal AC line voltage conditions results in less efficient operation and more power dissipating losses, because each power transfer cycle includes a freewheeling period. No power transfer happens during the freewheeling period, but circulation losses do arise.

Hence, there is a need for a more efficient technique of operating a PSFB converter during nominal AC line voltage conditions while maintaining output voltage regulation during interruptions in the AC line voltage input.

SUMMARY

According to an embodiment of a phase shift full bridge (PSFB) converter, the PSFB converter comprises: an isolation transformer having a primary side and a secondary side; a full-bridge comprising a first pair of switch devices connected in series at a first node coupled to a first terminal of the primary side of the isolation transformer, and a second pair of switch devices connected in series at a second node coupled to a second terminal of the primary side of the isolation transformer; a rectifier coupled to the secondary side of the isolation transformer; and a controller operable to switch the first and the second pairs of switch devices out of phase with each other, wherein under nominal input voltage conditions for the PSFB, the controller is operable to switch the first and the second pairs of switch devices at a nominal switching frequency, wherein under reduced input voltage conditions for the PSFB, the controller is operable to switch the first and the second pairs of switch devices at a frequency lower than the nominal switching frequency.

In one embodiment, under the reduced input voltage conditions, the controller is operable to continually adjust the frequency at which the first and the second pairs of switch devices are switched based on input voltage to the PSFB.

Separately or in combination, the controller may be operable to compare the input voltage or an estimate of the input voltage to a voltage threshold and continually adjust the frequency at which the first and the second pairs of switch devices are switched if the input voltage or the estimate of the input voltage is below the voltage threshold.

Separately or in combination, the controller may comprise a comparator with hysteresis and may be configured to indicate when the input voltage or the estimate of the input voltage drops below the voltage threshold.

Separately or in combination, wherein under the reduced input voltage conditions, the controller may be operable to linearly adjust the frequency at which the first and the second pairs of switch devices are switched based on the input voltage.

Separately or in combination, the controller may be operable to switch the first and the second pairs of switch devices at a first discrete frequency under the nominal input voltage conditions and switch the first and the second pairs of switch devices at a second discrete frequency lower than the first discrete frequency under the reduced input voltage conditions.

Separately or in combination, the controller may be operable to compare the input voltage or an estimate of the input voltage to a voltage threshold and change the frequency at which the first and the second pairs of switch devices are switched from the first discrete frequency to the second discrete frequency if the input voltage or the estimate of the input voltage is below the voltage threshold.

Separately or in combination, the controller may be operable to change the frequency at which the first and the second pairs of switch devices are switched from the second discrete frequency back to the first discrete frequency if the input voltage or the estimate of the input voltage increases above the voltage threshold.

According to an embodiment of a method of operating a PSFB converter that includes an isolation transformer having a primary side and a secondary side, a full-bridge having a first pair of switch devices connected in series at a first node coupled to a first terminal of the primary side of the isolation transformer and a second pair of switch devices connected in series at a second node coupled to a second terminal of the primary side of the isolation transformer, and a rectifier coupled to the secondary side of the isolation transformer, the method comprises: switching the first and the second pairs of switch devices out of phase with each other; under nominal input voltage conditions for the PSFB, switching the first and the second pairs of switch devices at a nominal switching frequency; and under reduced input voltage conditions for the PSFB, switching the first and the second pairs of switch devices at a frequency lower than the nominal switching frequency.

Switching the first and the second pairs of switch devices at a frequency lower than the nominal switching frequency may comprise continually adjusting the frequency at which the first and the second pairs of switch devices are switched based on input voltage to the PSFB.

Separately or in combination, continually adjusting the frequency at which the first and the second pairs of switch devices are switched based on the input voltage may comprise: comparing the input voltage or an estimate of the input voltage to a voltage threshold; and continually adjusting the frequency at which the first and the second pairs of switch devices are switched if the input voltage or the estimate of the input voltage is below the voltage threshold.

Separately or in combination, the input voltage or the estimate of the input voltage may be compared to the voltage threshold with hysteresis to indicate when the input voltage or the estimate of the input voltage drops below the voltage threshold.

Separately or in combination, continually adjusting the frequency at which the first and the second pairs of switch devices are switched based on the input voltage may comprise linearly adjusting the frequency at which the first and the second pairs of switch devices are switched based on the input voltage.

Separately or in combination, switching the first and the second pairs of switch devices at a nominal switching frequency under the nominal input voltage conditions may comprise switching the first and the second pairs of switch devices at a first discrete frequency, and switching the first and the second pairs of switch devices at a frequency lower than the nominal switching frequency under the reduced input voltage conditions may comprise switching the first and the second pairs of switch devices at a second discrete frequency lower than the first discrete frequency.

Separately or in combination, switching the first and the second pairs of switch devices at the second discrete frequency under the reduced input voltage conditions may comprise: comparing the input voltage or an estimate of the input voltage to a voltage threshold; and changing the frequency at which the first and the second pairs of switch devices are switched from the first discrete frequency to the second discrete frequency if the input voltage or the estimate of the input voltage is below the voltage threshold.

Separately or in combination, the method may further comprise changing the frequency at which the first and the second pairs of switch devices are switched from the second discrete frequency back to the first discrete frequency if the input voltage or the estimate of the input voltage increases above the voltage threshold.

Separately or in combination, the input voltage or the estimate of the input voltage may be compared to the voltage threshold with hysteresis to indicate when the input voltage or the estimate of the input voltage drops below the voltage threshold.

According to an embodiment of an AC/DC converter, the AC/DC converter comprises: an AC/DC stage configured to convert an AC line voltage to a DC voltage; and a PSFB converter coupled to the AC/DC stage. The PSFB comprises: an isolation transformer having a primary side and a secondary side; a full-bridge comprising a first pair of switch devices connected in series at a first node coupled to a first terminal of the primary side of the isolation transformer, and a second pair of switch devices connected in series at a second node coupled to a second terminal of the primary side of the isolation transformer; a rectifier coupled to the secondary side of the isolation transformer; and a controller operable to switch the first and the second pairs of switch devices out of phase with each other, wherein under nominal AC line voltage conditions, the controller is operable to switch the first and the second pairs of switch devices at a nominal switching frequency, wherein under reduced AC line voltage conditions, the controller is operable to switch the first and the second pairs of switch devices at a frequency lower than the nominal switching frequency.

In one embodiment, under the reduced input voltage conditions, the controller of the PSFB is operable to continually adjust the frequency at which the first and the second pairs of switch devices are switched based on input voltage to the PSFB.

Separately or in combination, the controller of the PSFB may be operable to switch the first and the second pairs of switch devices at a first discrete frequency under the nominal input voltage conditions and switch the first and the second pairs of switch devices at a second discrete frequency lower than the first discrete frequency under the reduced input voltage conditions.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Embodiments described herein provide a control technique which increases the efficiency of a PSFB converter during nominal AC line voltage conditions while maintaining output voltage regulation during interruptions in the AC line voltage input. Under nominal input voltage conditions for the PSFB, the full-bridge on the primary side of the PSFB is switched at a nominal switching frequency. Under reduced input voltage conditions for the PSFB, the full-bridge on the primary side of the PSFB is switched at a frequency lower than the nominal switching frequency. This way, the PSFB converter has a more ideal duty cycle under nominal input voltage, and when the input voltage, the switching frequency of the PSFB is reduced to ensure adequate freewheeling time and thus continued output voltage regulation.

Figure 1:
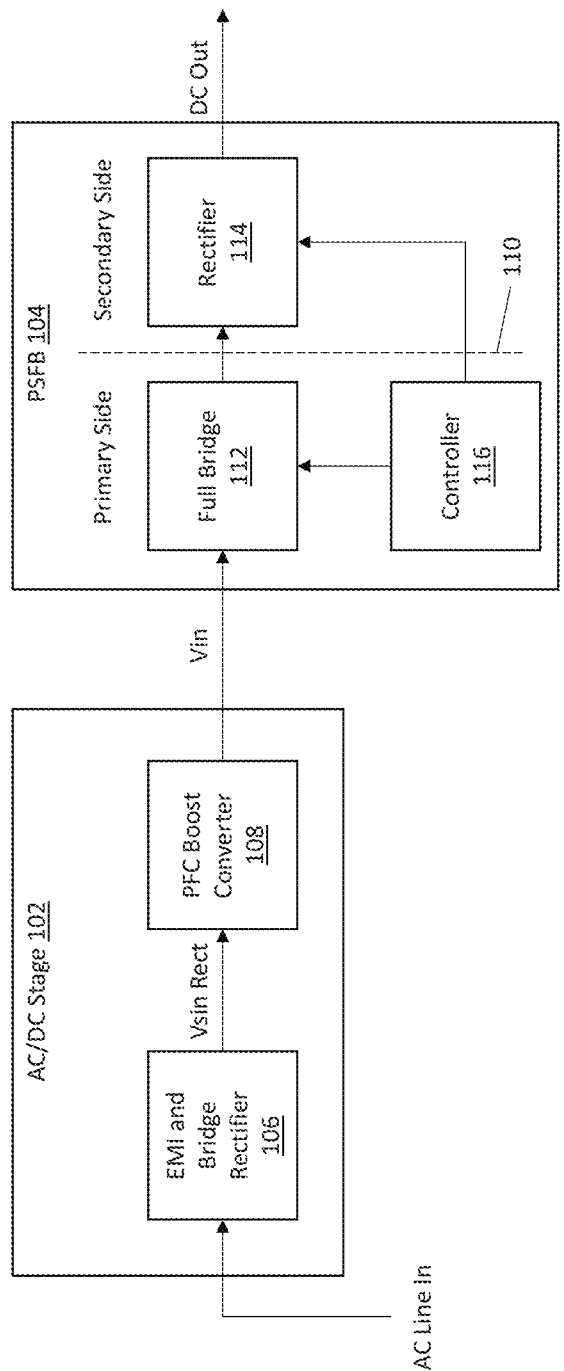
FIG. 1 illustrates a schematic diagram of an embodiment of an AC/DC converter having a phase-shift full bridge (PSFB) converter as a DC/DC stage.

FIG. 1 illustrates an embodiment an AC/DC converter 100. The AC/DC converter 100 includes an AC/DC stage 102 and a PSFB converter 104 coupled to the AC/DC stage 102. The AC/DC stage 102 converts an AC line voltage ('AC Line In') to a DC link voltage ('Vin'). In one embodiment, the AC/DC stage 102 includes EMI (electromagnetic interference) and bridge rectification circuitry 106 for filtering noise and converting the filter input to a rectified signal ('Vsin Rect'). The AC/DC stage 102 may also include a PFC (power factor correction) boost converter 108 for shaping the input current of the AC/DC converter to be in synchronization with the AC line voltage input, and thus providing a DC link voltage ('Vin') to the PSFB converter 104.

The PSFB converter 104 provides voltage translation between the DC link voltage ('Vin') and the DC output voltage ('Vout') of the AC/DC converter 100 and also provides isolation from the AC line voltage input ('AC Line In'). The PSFB converter 104 includes an isolation transformer 110, a full-bridge 112 coupled to the primary side of the isolation transformer 110, a rectifier 114 coupled to the secondary side of the isolation transformer 110, and a controller 116 to control switching of the full bridge 112 and optionally the rectifier 114. The transformer 110 is illustrated as a dashed line in FIG. 1, to indicate the isolation between the primary (left-hand) and secondary (right-hand) sides of the PSFB converter 104. The controller 116 is shown on the primary side of the PSFB converter 104 in FIG. 1, but instead may be on the secondary side and coupled to the primary side by, e.g., an optocoupler. Operation of the PSFB converter 104 is described next in more detail.

Figure 2:
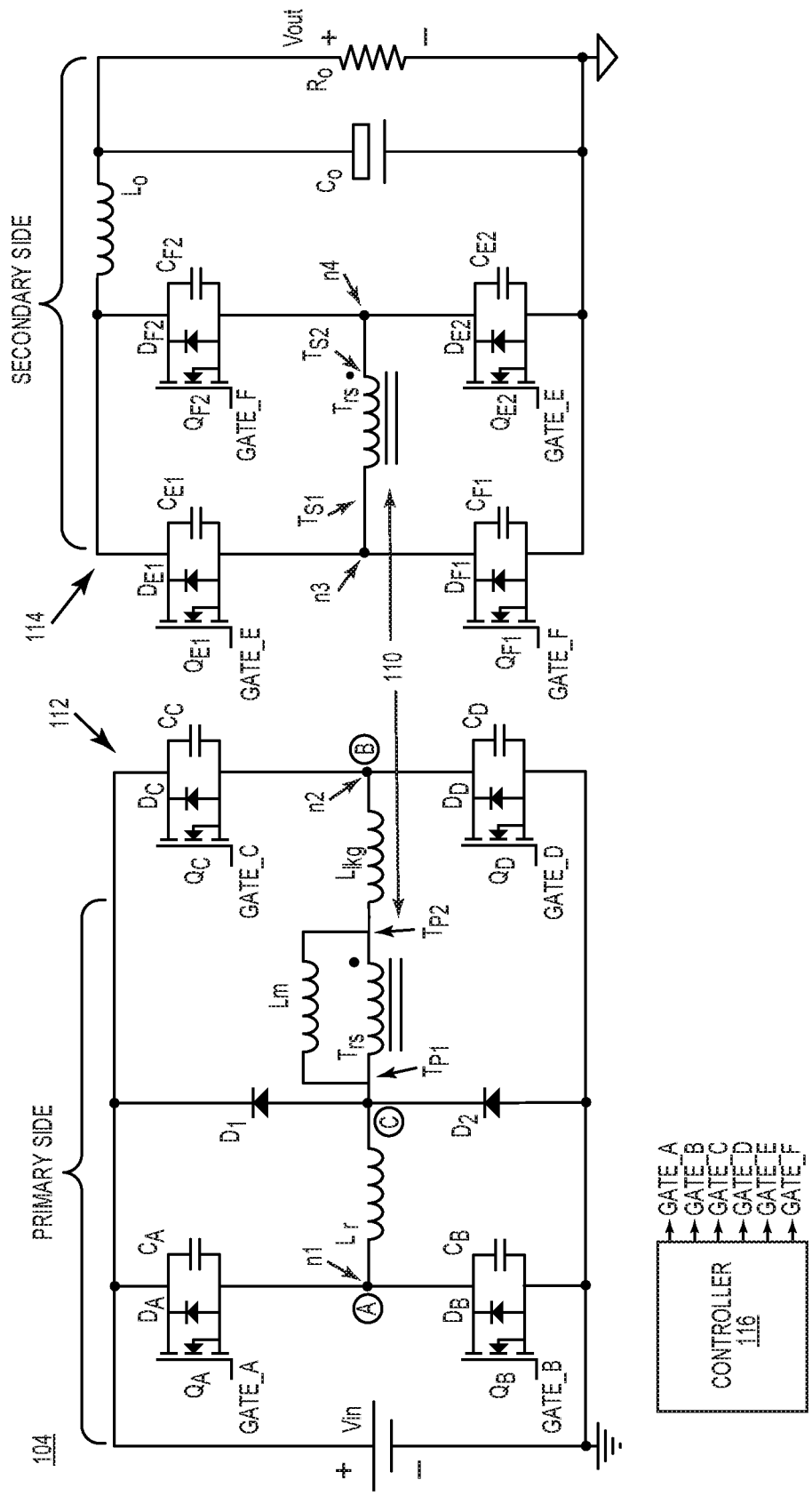
FIG. 2 illustrates a schematic diagram of an embodiment of the PSFB converter.

FIG. 2 illustrates an embodiment of the PSFB converter 104. The load powered by the PSFB converter 104 is generically illustrated as a resistor Ro in FIG. 2. The PSFB converter 104 includes a primary side having a plurality of switch devices $Q_A$, $Q_B$, $Q_C$, $Q_D$ that form the full bridge 112, and a secondary side having a plurality of switch devices $Q_{E1}$, $Q_{E2}$, $Q_{F1}$, $Q_{F2}$ that form the rectifier 114. The secondary side also includes an output filter coupled to the rectifier 114, the output filter including an output inductor Lo and an output capacitor Co. The DC link voltage Vin output by the AC/DC stage 102 to the PSFB converter 104 is represented as a battery in FIG. 2.

On the primary side of the PSFB converter 104, high-side switch device $Q_A$ is connected in series with low-side switch device $Q_B$ at node 'n1'/'A' to form a first leg $Q_A/Q_B$ of the full bridge 112, and high-side switch device $Q_C$ is connected in series with low-side switch device $Q_D$ at node 'n2'/'B' to form a second leg $Q_C/Q_D$ of the full bridge 112. Node n1 is coupled to a first terminal '$T_{P1}$' of the primary side of the isolation transformer 110 and node n2 is coupled to a second terminal '$T_{P2}$' of the primary side of the isolation transformer 110. The isolation transformer 110 is shown as being split between the primary side (Trp) and the secondary side (Trs) for ease of illustration.

Similarly on the secondary side, high-side switch device $Q_{E1}$ is connected in series with low-side switch device $Q_{F1}$ at node 'n3' to form a first leg $Q_{E1}/Q_{F1}$ of the rectifier 114, and high-side switch device $Q_{F2}$ is connected in series with low-side switch device $Q_{E2}$ at node 'n4' to form a second leg $Q_{F2}/Q_{E2}$ of the rectifier 114. Node n3 is coupled to a first terminal '$T_{S1}$' of the secondary side of the isolation transformer 110 and node n2 is coupled to a second terminal '$T_{S2}$' of the secondary side of the isolation transformer 110.

Those skilled in the art will readily understand that a different type of rectifier may be used on the secondary side of the PSFB converter 104 such as, but not limited to, a current-fed push-pull, center-taped or current doubler rectification stage, etc. Also, the primary-side switch devices $Q_A$ through $Q_D$ and the secondary-side switch devices $Q_{E1}$ through $Q_{F2}$ of the PSFB converter 104 are illustrated as power MOSFETs each having a corresponding freewheeling diode $D_A$-$D_D$ and $D_{E1}$-$D_{F2}$ and parasitic capacitance $C_A$-$C_D$ and $C_{E1}$-$C_{F2}$. However, any suitable power transistor can be used for the primary-side switch devices $Q_A$ through $Q_D$ and the secondary-side switch devices $Q_{E1}$ through $Q_{F2}$ of the PSFB converter 104, such as but not limited to power MOSFETs, IGBTs (insulated gate bipolar transistors), HEMTs (high-electron mobility transistors), etc.

The PSFB controller 116, which may be located on the primary or secondary side of the converter 104, controls the primary-side switch devices $Q_A$ through $Q_D$ and the secondary-side switch devices $Q_{E1}$ through $Q_{F2}$ during nominal AC line voltage conditions and during interruptions in the AC line voltage input. For example, the nominal DC link voltage 'Vin' to the PSFB converter 104 may be 400V during nominal AC line voltage conditions and may drop to about 300V, plus or minus, during an AC outage. Under nominal AC line voltage conditions, the controller 116 switches the legs $Q_A/Q_B$, $Q_C/Q_D$ of switch devices $Q_A$, $Q_B$, $Q_C$, $Q_D$ out of phase with each other to transfer energy from the primary side of the PSFB converter 104 to the secondary side. If the legs $Q_A/Q_B$, $Q_C/Q_D$ of switch devices $Q_A$, $Q_B$, $Q_C$, $Q_D$ are switched in phase with each other, no energy transfer will occur. This is a defining characteristic of PSFB converters. Under reduced AC line voltage conditions, the controller 116 switches the legs $Q_A/Q_B$, $Q_C/Q_D$ of switch devices $Q_A$, $Q_B$, $Q_C$, $Q_D$ out of phase with each other at a frequency lower than the nominal switching frequency to transfer energy to the secondary side of the PSFB converter 104 and maintain regulation.

Figure 3:
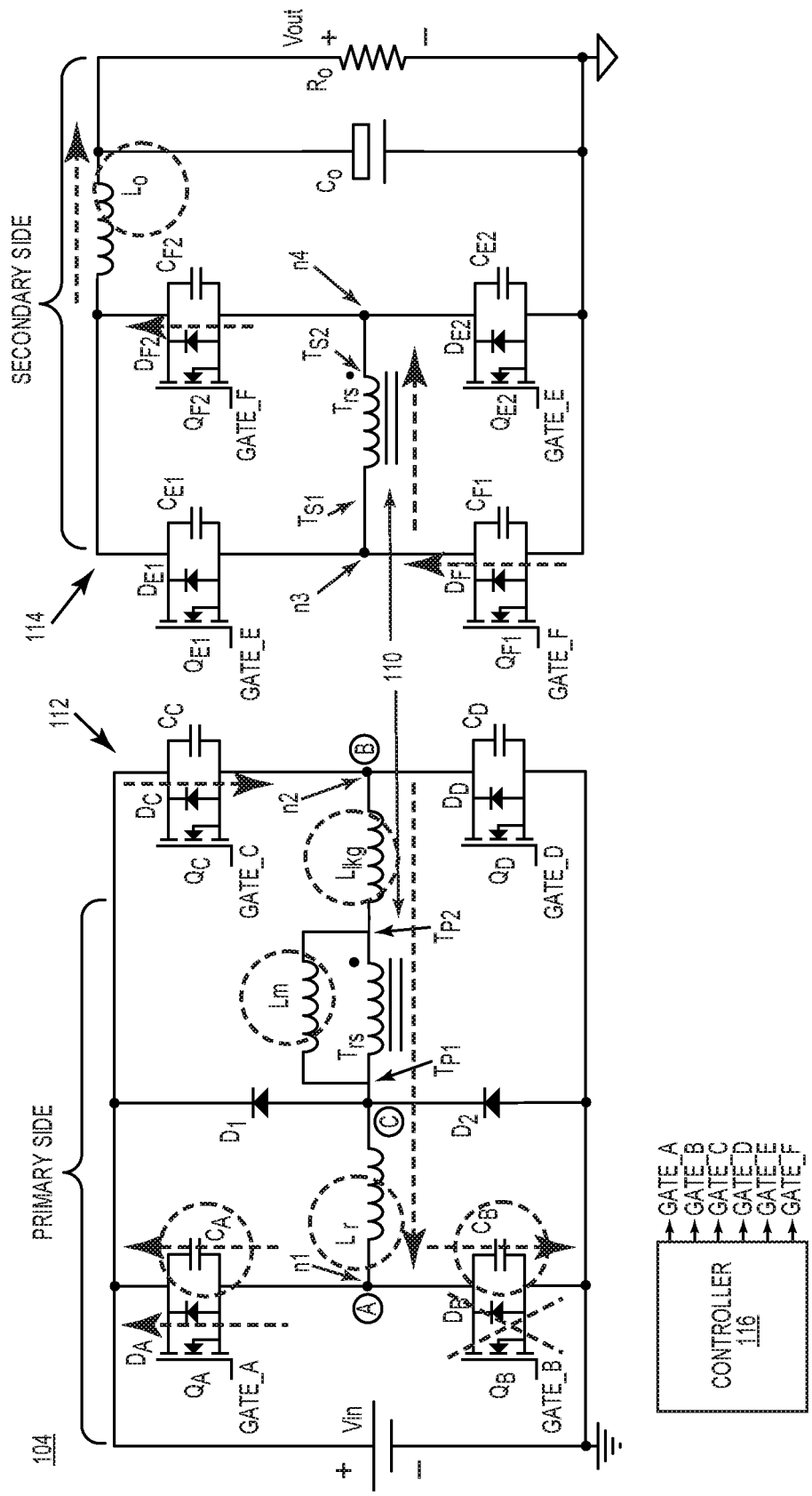
FIGS. 3 through 5 illustrate operation of the PSFB converter during different stages of a power transfer interval, and corresponding control signals generated by a controller of the PSFB converter.
Figure 4:
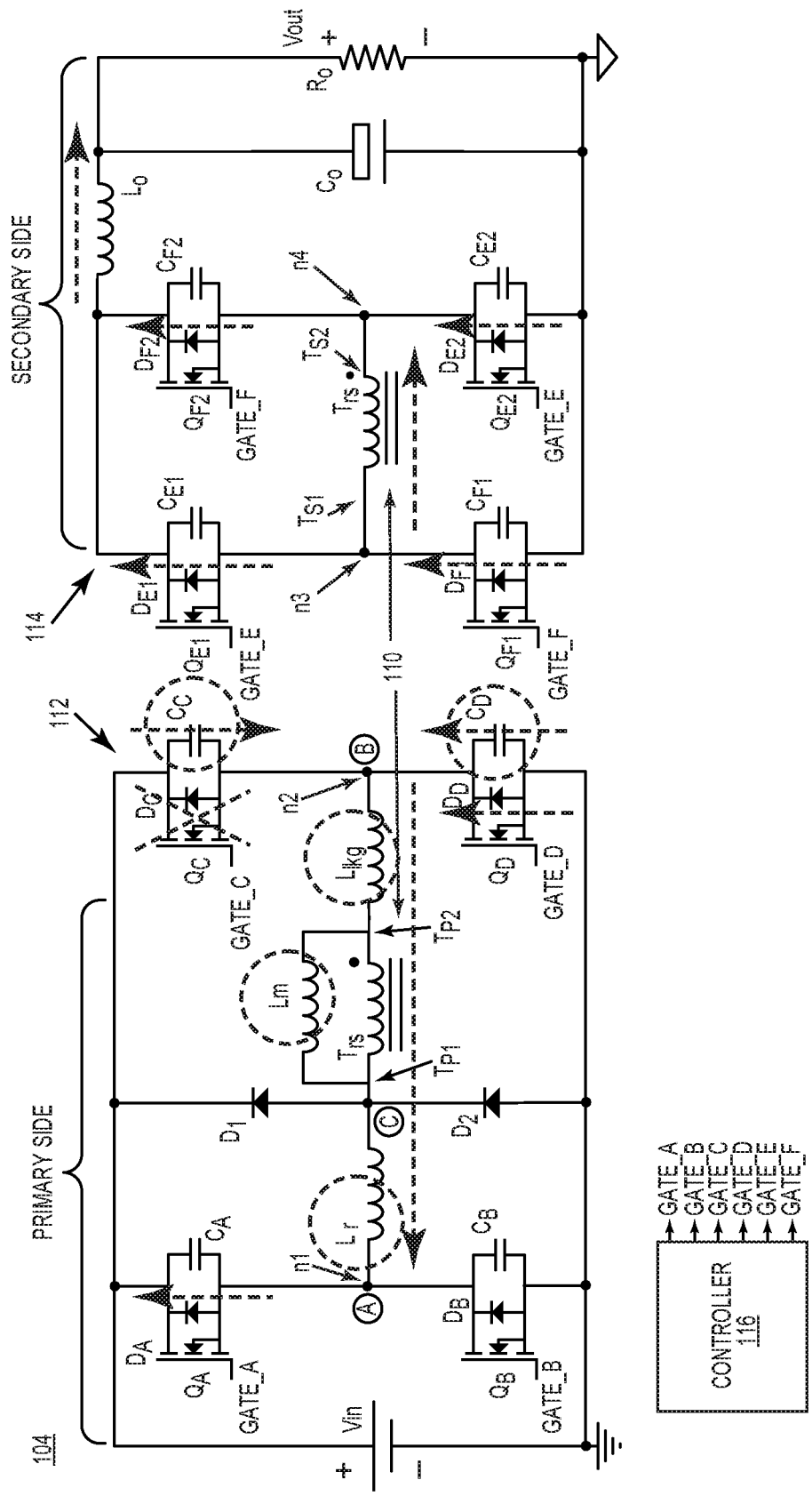
Figure 5:
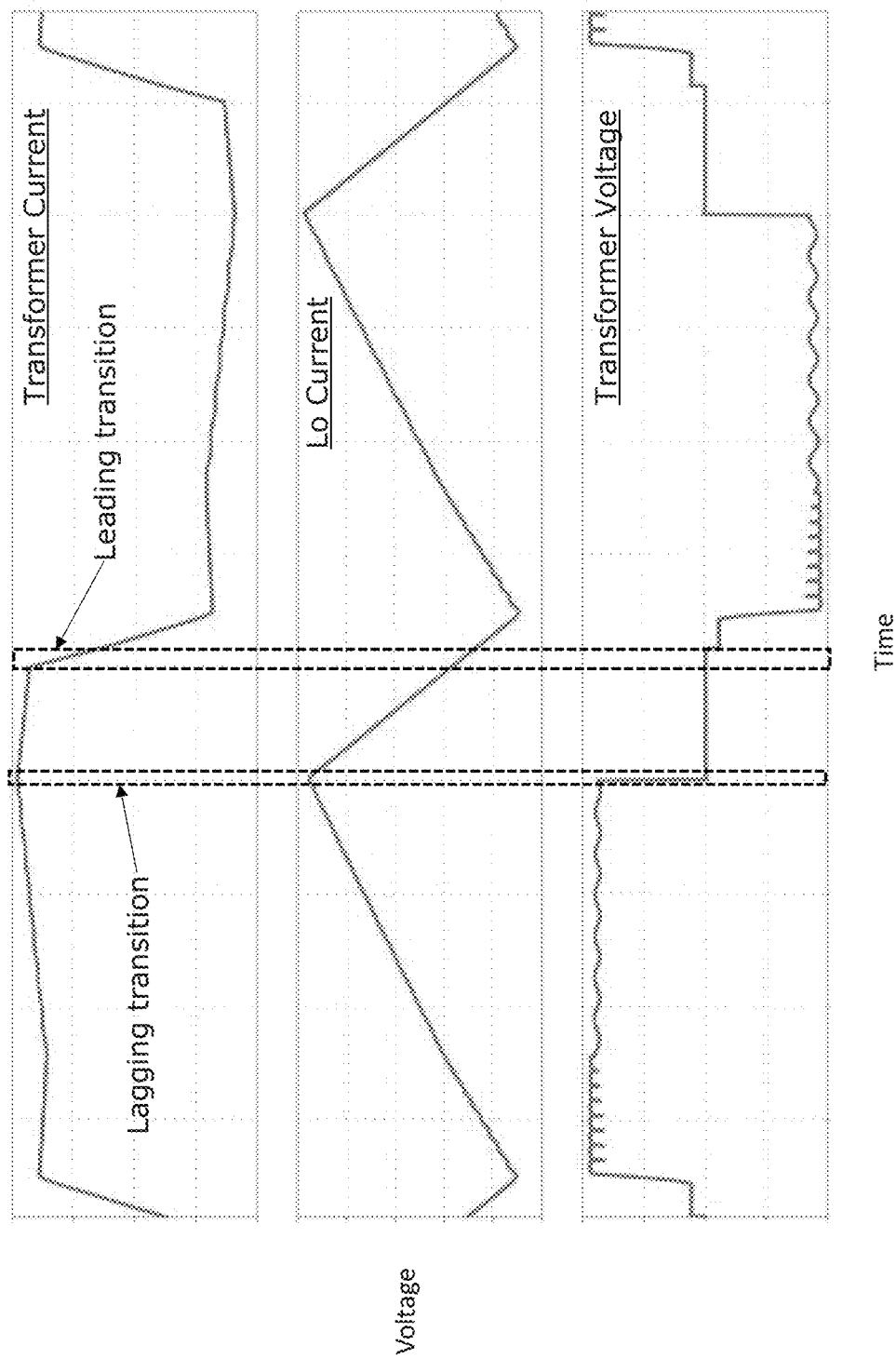

FIGS. 3 through 5 illustrate operation of the PSFB converter 104 during different stages of a power transfer interval, and the corresponding control signals generated by the controller 116. In phase-shift full bridge converter topology, the range of zero voltage switching (ZVS) is given by the energy stored in the magnetics Lr, Llkg, Lo and Lm where Lr is the external resonant inductance of the PSFB converter 104, Llkg is the leakage inductance of the isolation transformer 110, Lo is the inductance of the output inductor Lo on the secondary side of the converter 104, and Lm is the magnetizing inductance in the primary of the transformer 110. The two legs ($Q_A/Q_B$, $Q_C/Q_D$) of the half bridge 112 on the primary side behave differently during switching transitions. One leg of the full bridge 112 turns on-off after a power transfer from the primary side to the secondary side, also referred to herein as a lagging power transfer, as shown in FIG. 5. The other leg of the full bridge 112 leads the following power transfer, also referred to herein as a leading power transfer, also as shown in FIG. 5.

FIG. 3 shows current flow in the primary and secondary sides of the PSFB converter 104 during a lagging power transfer, whereas FIG. 4 shows current flow in the primary and secondary sides of the PSFB converter 104 during a leading power transfer. The current flows in the primary and secondary sides of the PSFB converter 104 are illustrated as thick dashed lines with arrows in FIGS. 3 and 4, and the primary-side switch devices which are turned off are illustrated with a dashed 'X'.

During a lagging power transfer, the lagging leg (leg $Q_A/Q_B$ in FIGS. 3 and 4) transition occurs just after a power transfer from the primary side which includes the full bridge 112 to the secondary side which includes the rectifier 114. During the lagging leg transition, which is illustrated in FIG. 3, switch device $Q_B$ has turned OFF and energy of the inductances flows into parasitic capacitances $C_A$, $C_B$ until the diode $D_A$ in parallel with switch device $Q_A$ conducts, thereby enabling ZVS. The current path through the diode $D_A$ in parallel with switch device $Q_A$ is illustrated as a thick dashed line with an arrow in FIG. 3.

Because the filter inductance Lo is effectively connected through the full bridge 112 by the isolation transformer 110 during the transition in the lagging power transfer, the energy available for charging/discharging the parasitic capacitances $C_A$, $C_B$ of the lagging leg $Q_A/Q_B$ of the full bridge 112 is given by:

$$E_{lagging} = \frac{Ip^2 * (Lr + Llkg + Lo') + Im^2 * Lm}{2} \quad (1)$$

To achieve full ZVS on the lagging leg $Q_A/Q_B$ of the full bridge 112, the available energy should be bigger than the total energy Eoss of the output capacitance of the lagging leg $Q_A/Q_B$ of the full bridge 112 plus other stray capacitances of the half bridge node, as given by:

$$E_{oss} \leq \frac{Ip^2 * (Lr + Llkg + Lo') + Im^2 * Lm}{2} \quad (2)$$

where Lo' is the equivalent reflected value of the output filter inductance through the transformer and which is given by:

$$Lo' = Lo * \left(\frac{Np}{Ns}\right)^2 \quad (3)$$

For a step-down converter in which the number of transformer windings (Np) on the primary side is greater than the number of transformer windings (Ns) of the secondary side, the contribution of energy by the output filter inductance Lo is in general much higher than the contribution by the other inductances. Accordingly, ZVS is typically achieved through all load ranges for the lagging leg $Q_A/Q_B$ of the full bridge 112.

The leading leg (leg $Q_C/Q_D$ in FIGS. 3 and 4) transition occurs before a power transfer from the primary side to the secondary side and after a freewheeling phase, as shown in FIG. 5. No power transfer happens during the freewheeling phase, but circulation losses do arise. The PSFB control techniques described minimize the freewheeling phase under nominal input voltage conditions for the PSFB, thereby avoiding most if not all of the circulation losses which would otherwise occur.

During the leading leg transition, which is illustrated in FIG. 4, switch device $Q_C$ has turned OFF and energy of the inductances flows into parasitic capacitances $C_C$, $C_D$ until the diode $D_A$ in parallel with switch device $Q_D$ conducts, thereby enabling ZVS. The current path through the diode $D_A$ in parallel with switch device $Q_D$ is illustrated as a thick dashed line with an arrow in FIG. 4.

If the freewheeling phase occurs, the isolation transformer 110 is effectively shorted by the rectifier 114 during the freewheeling phase and the output filter inductance Lo does not contribute to the leading leg transition as shown in FIG. 4. Under these conditions, the energy available for charging/discharging the parasitic capacitances $C_C$, Co of the leading leg $Q_C/Q_D$ of the full bridge 112 is given by:

$$E_{leading} = \frac{Ip^2 * (Lr + Llkg) + Im^2 * Lm}{2} \quad (4)$$

To achieve full ZVS on the leading leg $Q_C/Q_D$ of the full bridge 112, the available energy should be bigger than the total energy Eoss of the output capacitance of the leading leg $Q_C/Q_D$ of the full bridge 112 plus other stray capacitances of the half bridge node, as given by:

$$E_{oss} \leq \frac{Ip^2 * (Lr + Llkg) + Im^2 * Lm}{2} \quad (5)$$

In this case, ZVS does not occur easily along all load ranges and typically requires careful design of the isolation transformer 110 and/or external resonant inductances. In general, increasing Lr, Llkg or reducing Lm increases the available energy. However, decreasing Lm increases the primary circulating current and therefore increases conduction losses. Increasing Lr and Llkg reduces the available duty cycle and thus limits the maximum load at which the PSFB converter 104 can regulate. To mitigate these problems, the PSFB controller 116 switches the (legs) pairs $Q_A/Q_B$, $Q_C/Q_D$ of full bridge switch devices $Q_A$, $Q_B$, $Q_C$, $Q_D$ at a nominal switching frequency under nominal input voltage conditions for the PSFB converter 104 and switches the (legs) pairs $Q_A/Q_B$, $Q_C/Q_D$ of full bridge switch devices $Q_A$, $Q_B$, $Q_C$, $Q_D$ at a frequency lower than the nominal switching frequency under reduced input voltage conditions for the PSFB converter 104. This way, the PSFB converter 104 operates with a more efficient (higher) duty cycle and lower (or no) freewheeling period during nominal AC line voltage conditions while still maintaining output voltage regulation during interruptions in the AC line voltage input. The effect duty cycle has on PSFB converter efficiency during nominal AC line voltage conditions is described next in more detail.

The effective duty of the PSFB converter 104 depends on the ratio of input to output voltages and the transformer ratio (Np/Ns) and is constant along load, as given by:

$$\text{Effective duty} = \frac{Vout}{Vin} * \frac{Np}{Ns} \quad (6)$$

Figure 6:
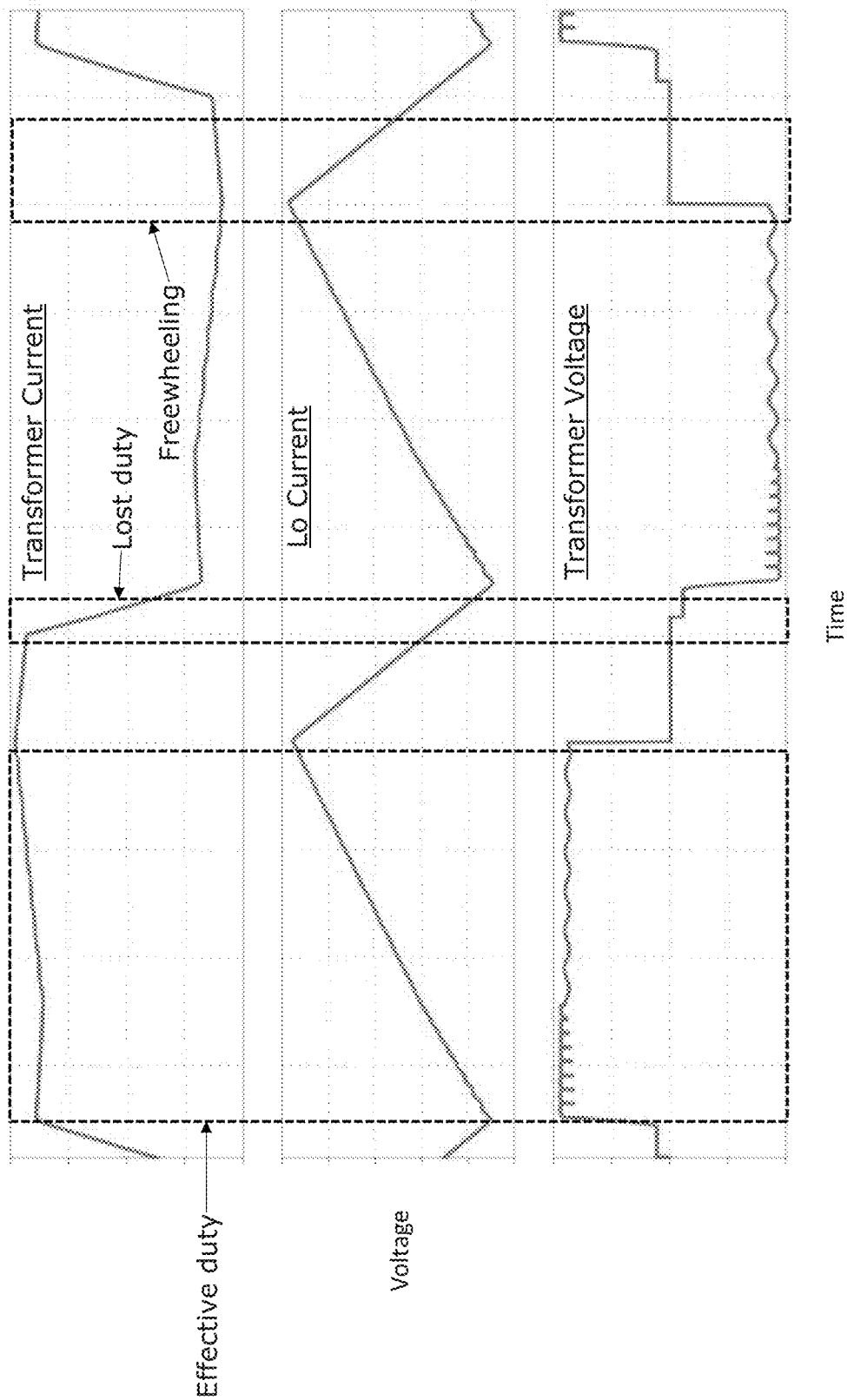
FIG. 6 illustrates duty loss of a PSFB converter operating under non-ideal duty cycle conditions.

The duty loss ('lost duty' in FIG. 6) due to the time needed to reverse primary current along the inductances $L_r$, $L_{lkg}$ reduces freewheeling time and depends on load, as primary current is the reflected secondary current plus the primary transformer magnetizing current, where:

$$\text{Lost duty} = \frac{Lr + Llkg}{Vin} * \Delta Ip * 2 * Fswitch, \quad (7)$$

$$\Delta Ip = 2 * Is * \frac{Ns}{Np}, \quad (8)$$

Freewheeling duty=1−Lost duty−Effective duty (9),

Ip is the primary current, Is is the secondary current, and Fswitch is the switching frequency of the PSFB converter 104.

Figure 7:
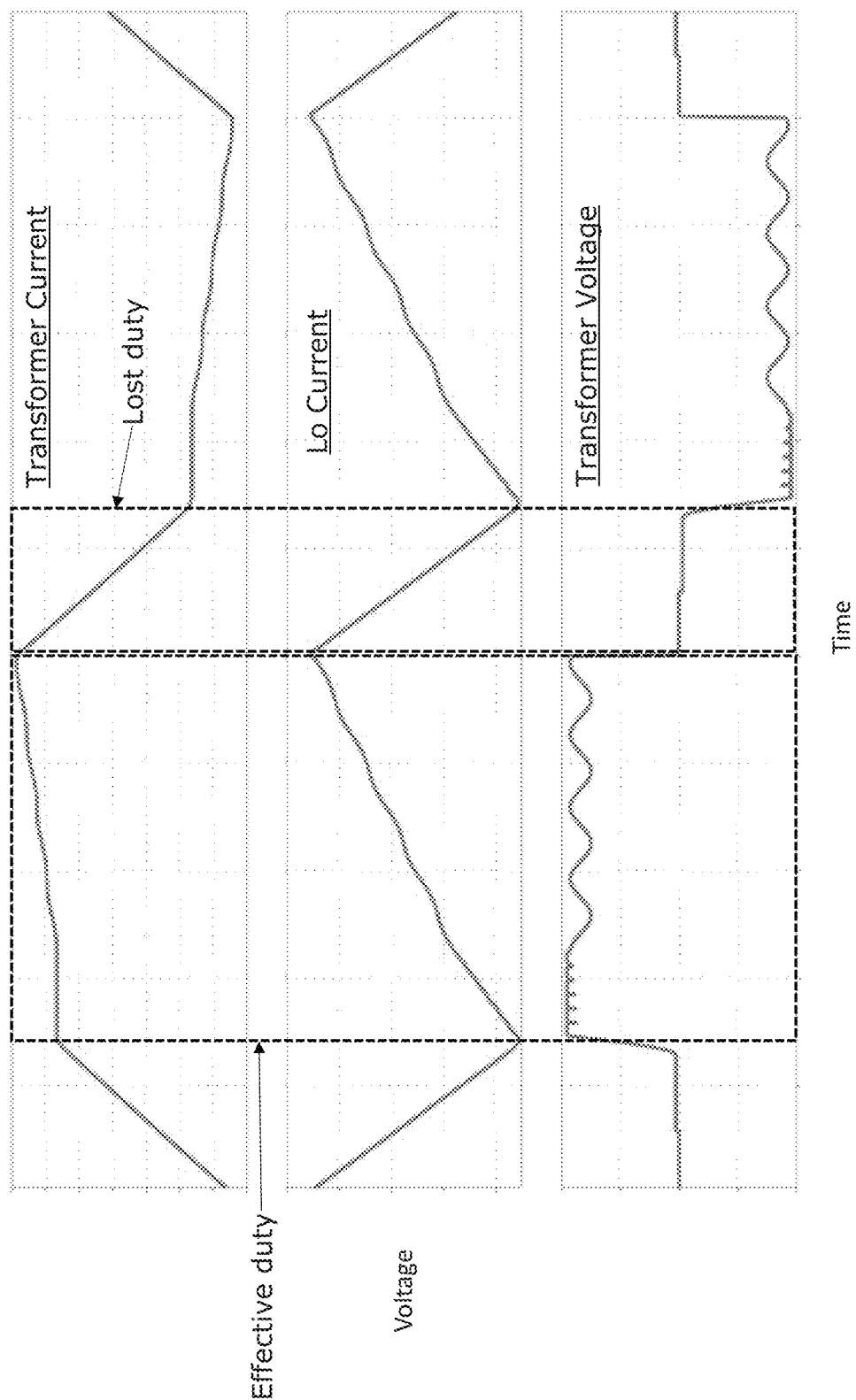
FIG. 7 illustrates an extreme case of freewheeling duty in which no more available regulation window available.

Freewheeling duty should be bigger than or equal to zero for the PSFB converter 104 to maintain regulation, as indicated in FIG. 7 which illustrates an extreme case in which no more available regulation window available.

For best efficiency, freewheeling time should be at or near zero at full load. This allows for maximum ZVS range for the full bridge 112, specifically for the leading leg. Also, there is less circulating current in the primary side of the PSFB converter 104 when freewheeling time is minimal. Maximum effective duty is also achieved, as is lower secondary side reflected voltage which allows for the use better secondary side voltage class switch devices.

However, in a full AC/DC converter design as shown in FIG. 1, the PSFB converter 104 should maintain output regulation at full load and during interruptions in the AC line voltage input ('AC Line In'). During an interruption of the AC line voltage input, the output voltage ('DC Link') of the AC/DC stage 102 drops (e.g. from 400V to 350V or even lower). The PSFB controller 116 ensures the PSFB converter 104, which is coupled to the AC/DC stage 102, maintains regulation over the entire input voltage range of interest by switching the full bridge 112 at a frequency lower than the nominal switching frequency under reduced AC line voltage conditions.

As explained above, the effective duty time depends on the ratio of input to output voltages and the transformer ratio and is constant along load. The effective duty time also depends on switching frequency Fswitch of the PSFB converter 104 as given by:

$$\text{Effective\_duty}_{time} = \frac{\frac{Vout}{Vin} * \frac{Np}{Ns}}{2 * F_{switch}} \quad (10)$$

The transformer frequency is 2 times the switching frequency Fswitch of the legs $Q_A/Q_B$, $Q_C/Q_D$ of the full bridge 112.

The time taken to reverse the primary current along inductances Lr, Llkg, i.e. lost duty, reduces the freewheeling time and depends on load, since the primary current is the reflected secondary current plus the primary transformer magnetizing current, which is dismissed in the simplified models provided herein but also based on switching frequency Fswitch of the full bridge 112. Hence, equations (7) and (8) may be reformulated as given by:

$$\text{Lost\_duty}_{time} = \frac{Lr + Llkg}{Vin} * \Delta Ip, \quad (11)$$

$$\Delta Ip = 2 * \overline{Is} * \frac{Ns}{Np} \quad (12)$$

Based on equations (11) and (12), the available regulation (freewheeling) time for the PSFB converter 102 depends on the switching frequency Fswitch as given by:

$$\text{Freewheeling}_{time} = \frac{1}{2 * F_{switch}} - \text{Lost\_duty}_{time} - \text{Effective\_duty}_{time} \quad (13)$$

Equation (13) can be further simplified. With all other conditions fixed, freewheeling time increases when switching frequency Fswitch of the PSFB converter 104 decreases as given by:

$$\text{Freewheeling}_{time} = -\frac{n^2 * Vout - n * Vin + 4 * \overline{Is} * Lr * F_{switch}}{2 * n * Vin * F_{switch}} \quad (14)$$

where $n = \frac{Np}{Ns}$.

Figure 8:
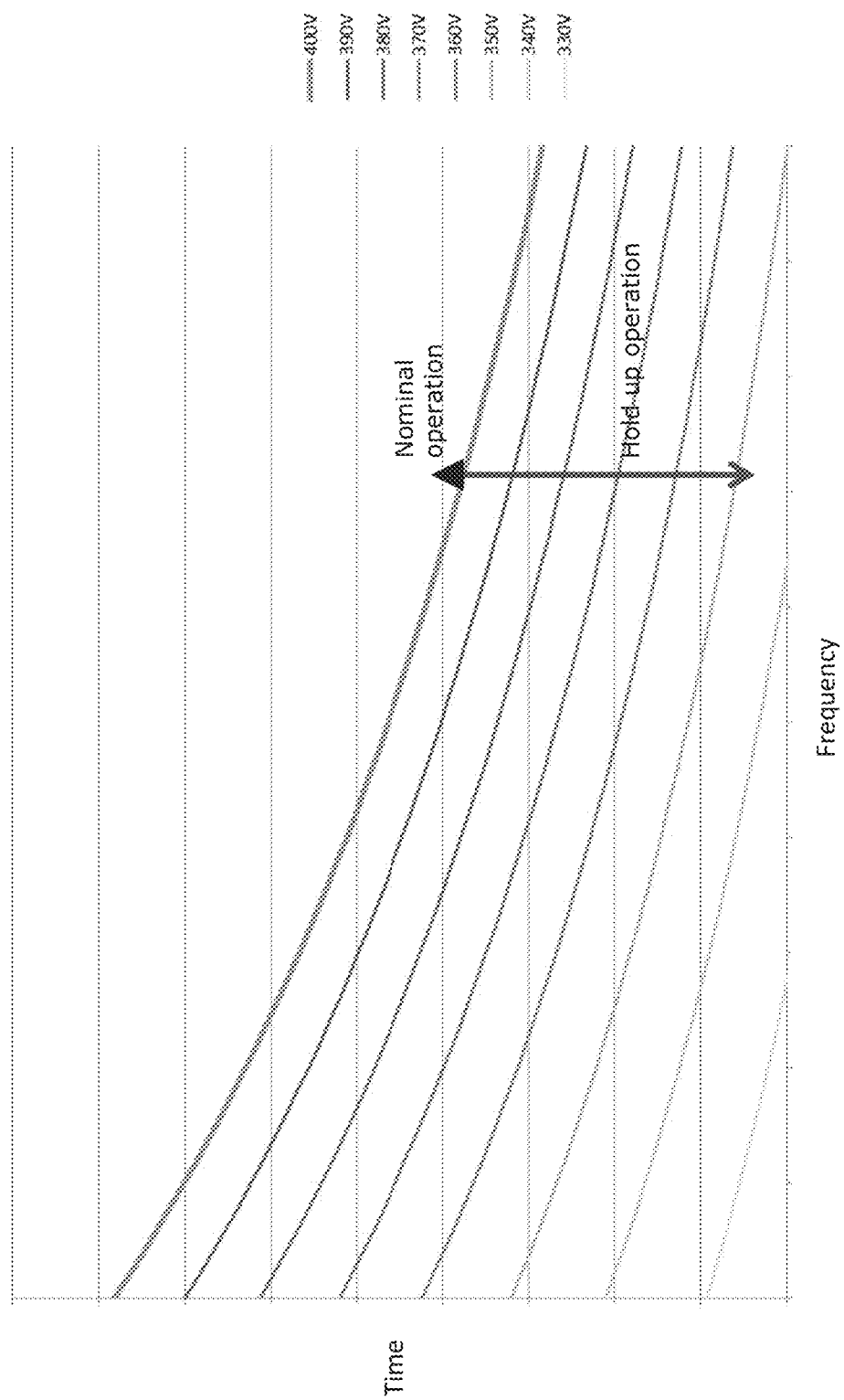
FIG. 8 illustrates freewheeling time dependency as a function of switching frequency for a typical PSFB converter at different DC link input voltages ranging from 400V down to 330V, with all other conditions fixed.

FIG. 8 illustrates freewheeling time dependency as a function of switching frequency Fswitch for a typical PSFB converter at different DC link input voltages ranging from 400V down to 330V, with all other conditions fixed. The vertical line with terminating arrows indicates the frequency trajectory of a typical PSFB modulation scheme in which a fixed duty cycle of e.g. 50% is used across the entire input voltage range, including during nominal operation and during reduced AC line voltage conditions ('Hold up operation' in FIG. 8). FIG. 8 shows that for the same PSFB input voltage, reducing the switching frequency Fswitch of the PSFB converter 104 increases freewheeling time.

The PSFB controller 116 modifies the switching frequency Fswitch of the PSFB converter 104 to compensate for the loss of duty cycle due to the drop-in input voltage. The controller 116 employs a more ideal duty cycle under nominal AC line voltage conditions, and when the input voltage to the PSFB converter 104 drops, the controller 116 reduces the switching frequency Fswitch of the PSFB converter 104 to ensure adequate freewheeling time under reduced AC line voltage conditions. The PSFB converter control scheme described herein allows for optimal performance at nominal conditions while fulfilling required specifications under reduced AC line voltage conditions.

Equations (10) through (14) may be reformulated so as to obtain a switching frequency Fswitch based on design parameters and load conditions, as given by:

$$F_{switch} = \frac{Vout * n^2 - Vin * n}{4 * \overline{Is} * Lr + 2 * n * Vin * \text{Freewheeling}_{time}} \quad (15)$$

The PSFB controller 116 modifies the switching frequency Fswitch of the PSFB converter 104 depending on the DC input voltage (Vin') to the PSFB converter 104. The controller 116 can modify the switching frequency Fswitch based on the PSFB input voltage whenever an input voltage measurement is available to the controller 116 and/or whenever the input voltage can be calculated based on other measurements available to the controller 116.

Figure 9:
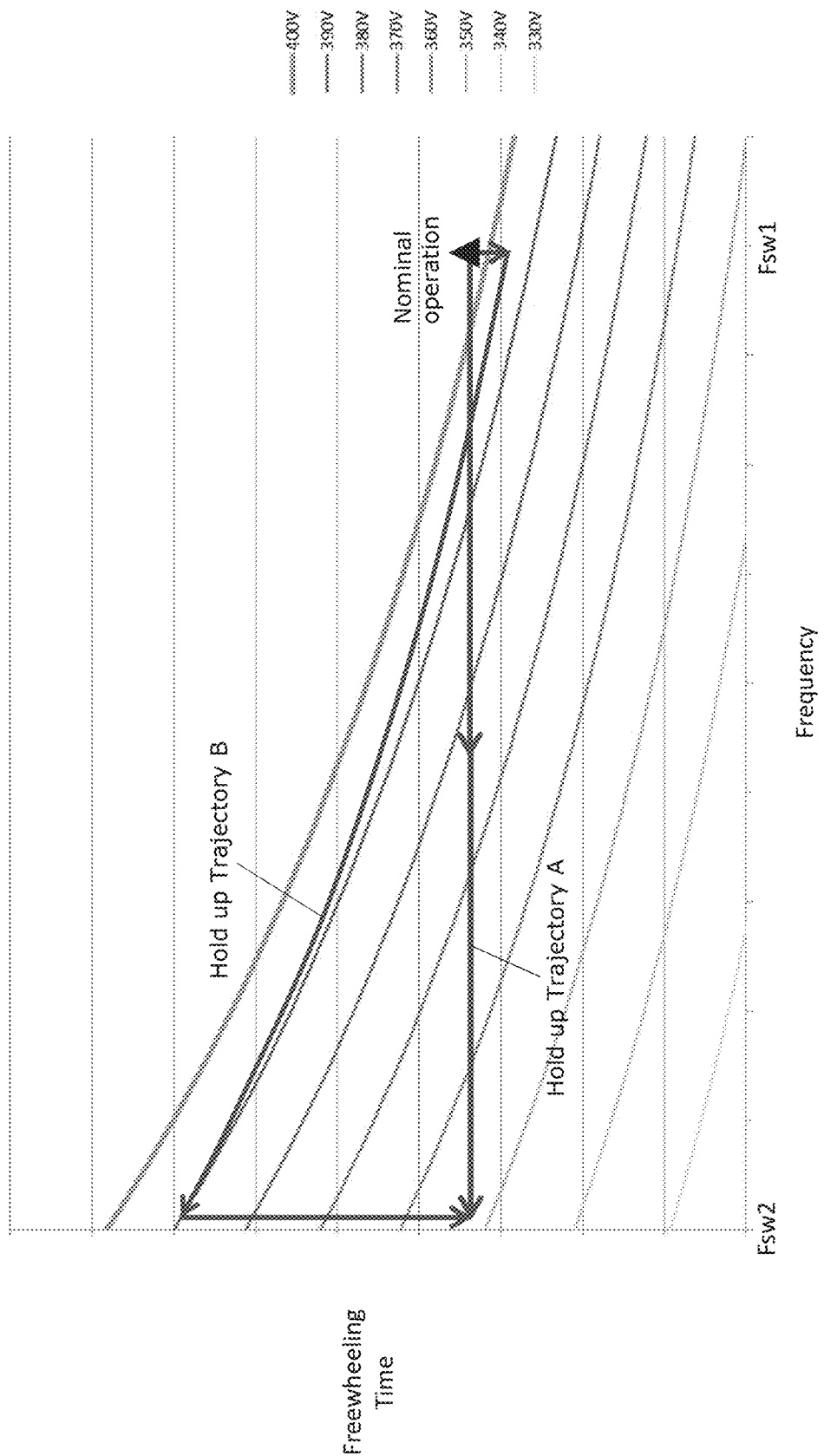
FIG. 9 illustrates discrete and continual PSFB switching frequency adjustment methods implemented by the controller of the PSFB converter.

FIG. 9 illustrates two different embodiments of Fswitch control based on PSFB input voltage, as implemented by the controller 116 of the PSFB converter 104. In one embodiment, under reduced input voltage conditions, the controller 116 switches the legs $Q_A/Q_B$, $Q_C/Q_D$ of full bridge switch devices $Q_A$, $Q_B$, $Q_C$, $Q_D$ at a first discrete frequency Fswitch1 under nominal input voltage conditions and switches the legs $Q_A/Q_B$, $Q_C/Q_D$ of full bridge switch devices $Q_A$, $Q_B$, $Q_C$, $Q_D$ at a second discrete frequency Fswitch2 lower than the first discrete frequency under reduced input voltage conditions. The discrete Fswitch adjustment trajectory is labelled 'Hold up Trajectory B' in FIG. 9.

The controller 116 may compare the PSFB input voltage or an estimate of the PSFB input voltage to a voltage threshold and change the switching frequency of the legs $Q_A/Q_B$, $Q_C/Q_D$ of full bridge switch devices $Q_A$, $Q_B$, $Q_C$, $Q_D$ from the first discrete frequency Fswitch1 to the second (lower) discrete frequency Fswitch2 if the PSFB input voltage or an estimate of the PSFB input voltage is below the voltage threshold. The controller 116 may change the frequency at which the legs $Q_A/Q_B$, $Q_C/Q_D$ of full bridge switch devices $Q_A$, $Q_B$, $Q_C$, $Q_D$ are switched from the second discrete frequency Fswitch2 back to the first (higher) discrete frequency Fswitch1 if the PSFB input voltage or an estimate of the PSFB input voltage increases above the voltage threshold. The controller 116 may utilize hysteresis to avoid frequent changes in Fswitch for PSFB input voltage changes near the voltage threshold. For example, the controller 116 may include a comparator with hysteresis and be configured to indicate when the PFSB input voltage or an estimate of the PSFB input voltage drops below the voltage threshold. The discrete adjustment of the PSFB switching frequency Fswitch resumes when the comparison result falls outside the hysteresis window.

In another embodiment, under reduced input voltage conditions, the controller 116 continually adjusts the switching frequency Fswitch of the legs $Q_A/Q_B$, $Q_C/Q_D$ of full bridge switch devices $Q_A$, $Q_B$, $Q_C$, $Q_D$ based on the input voltage to the PSFB converter 104. That is, the controller 116 modifies Fswitch so that Fswitch tracks the PSFB input voltage, e.g., using linear control. By using linear control, the controller 116 may linearly adjust the switching frequency Fswitch of the legs $Q_A/Q_B$, $Q_C/Q_D$ of full bridge switch devices $Q_A$, $Q_B$, $Q_C$, $Q_D$ based on the PSFB input voltage or an estimate thereof. The continual Fswitch adjustment trajectory is labelled 'Hold up Trajectory A' in FIG. 9.

The controller 116 may compare the input voltage Vin to the PSFB converter 104 or an estimate of the PSFB input voltage Vin to a voltage threshold and continually adjust the switching frequency Fswitch of the legs $Q_A/Q_B$, $Q_C/Q_D$ of full bridge switch devices $Q_A$, $Q_B$, $Q_C$, $Q_D$ if the PSFB input voltage Vin or an estimate of the PSFB input voltage Vin is below the voltage threshold. As explained above, the controller 116 may utilize hysteresis to avoid frequent changes in Fswitch for input voltage changes near the voltage threshold. For example, the controller 116 may include a comparator with hysteresis and be configured to indicate when the PSFB input voltage Vin or an estimate of the PSFB input voltage Vin drops below a voltage threshold. The continual adjustment of the PSFB switching frequency Fswitch resumes when the comparison result falls outside the hysteresis window.

Figure 10:
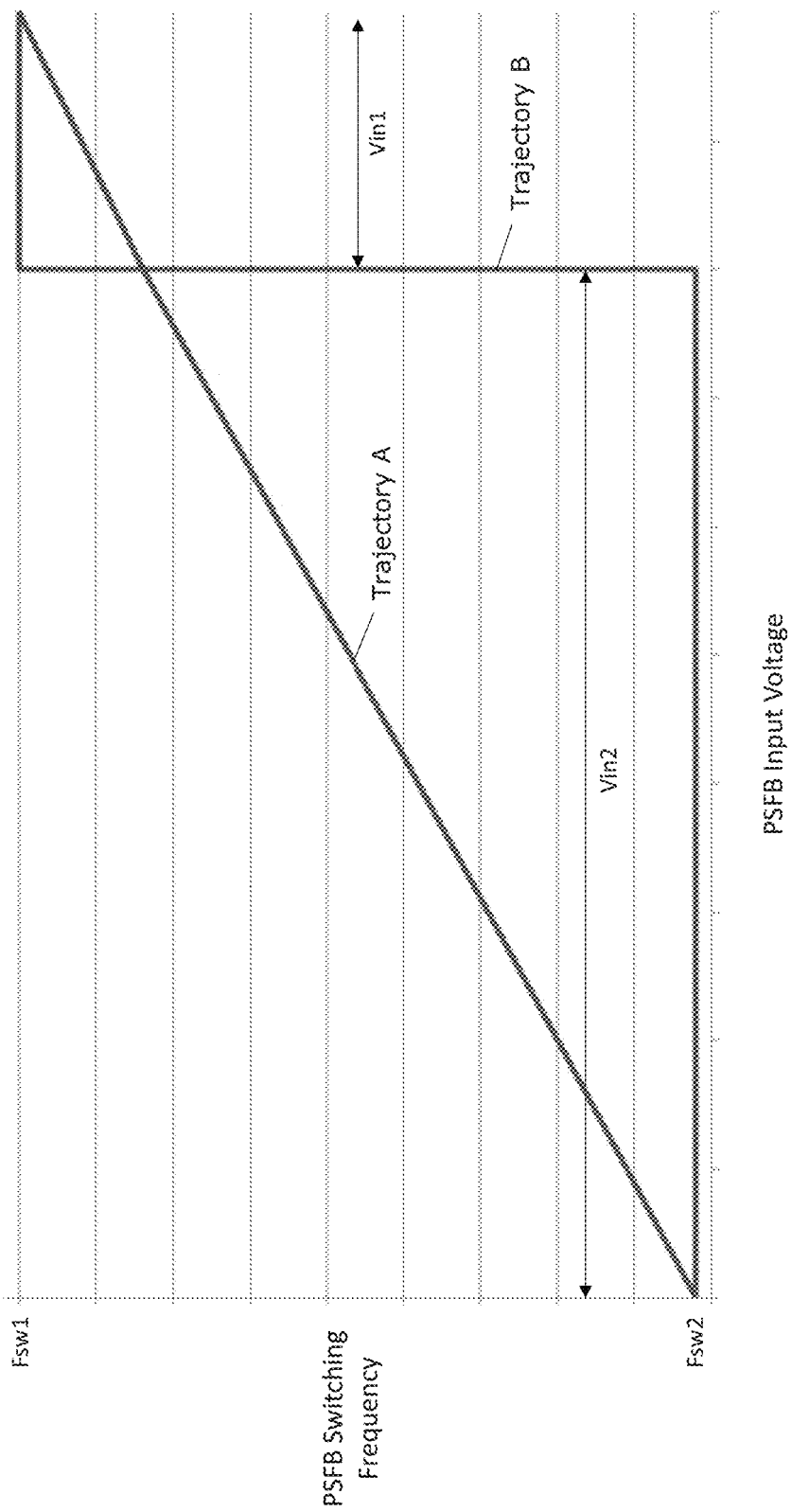
FIG. 10 illustrates the discrete and continual PSFB switching frequency control techniques shown in FIG. 9, as a function of PSFB input voltage.

FIG. 10 illustrates the discrete and continual Fswitch frequency control techniques shown in FIG. 9, as a function of PSFB input voltage. The continual Fswitch control trajectory is labeled 'Trajectory A' in FIG. 10, and the discrete Fswitch control trajectory is labeled 'Trajectory B'. Trajectory A maintains constant freewheeling time. Trajectory B implements two voltage windows 'Vin1', 'Vin2' with different frequencies 'Fswitch1', 'Fswitch2', respectively.

Figure 11:
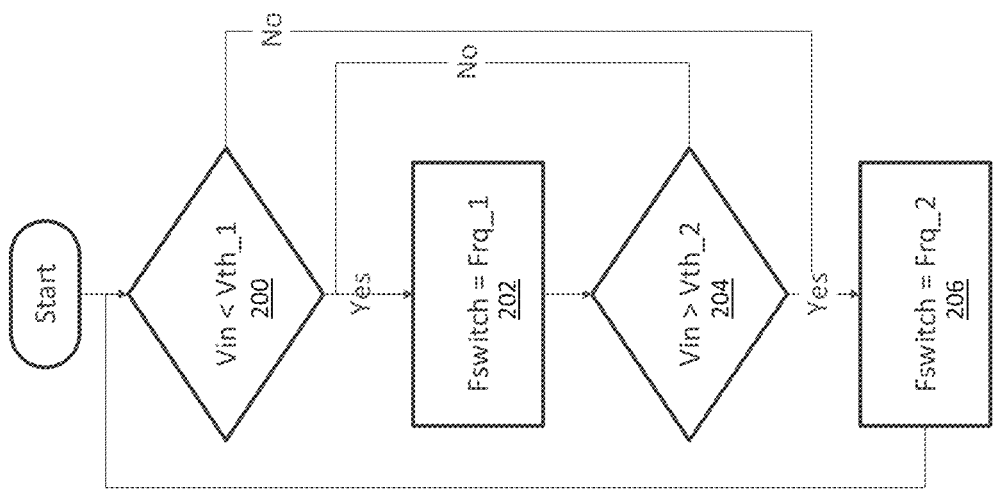
FIG. 11 illustrates an embodiment of the continual PSFB switching frequency adjustment method implemented by the controller of the PSFB converter.

FIG. 11 illustrates an embodiment of the control method implemented by the PSFB controller 116 for carrying out Trajectory A in FIG. 10, i.e., continual Fswitch adjustment. According to this embodiment, the controller 116 continually adjusts the switching frequency Fswitch at which the legs $Q_A/Q_B$, $Q_C/Q_D$ of full bridge switch devices $Q_A$, $Q_B$, $Q_C$, $Q_D$ are switched based on the PSFB input voltage Vin by comparing the input voltage Vin or an estimate of the input voltage Vin to a first voltage threshold Vth_1 (Block 200). As explained above, the legs $Q_A/Q_B$, $Q_C/Q_D$ of the full bridge 112 are switched out of phase to transfer energy from the primary side of the PSFB converter 104 to the secondary side. If the input voltage Vin or estimate thereof is below the first voltage threshold Vth_1, the controller 116 continually adjusts Fswitch as a function of Vin, e.g., by linear control (Block 202). The controller 116 maintains continual adjustment of Fswitch if the input voltage Vin remains below a second threshold Vth_2 (Block 204). If the input voltage Vin rises above the second threshold Vth_2, the controller 116 sets Fsw to a nominal frequency Frq_2 (Block 206). The controller 116 maintains Fsw=Frq_2 until the input voltage Vin once again drops below the first threshold Vth_1 (Block 200). In some cases, Vth_1 may equal Vth_2 with hysteresis to avoid.

Figure 12:
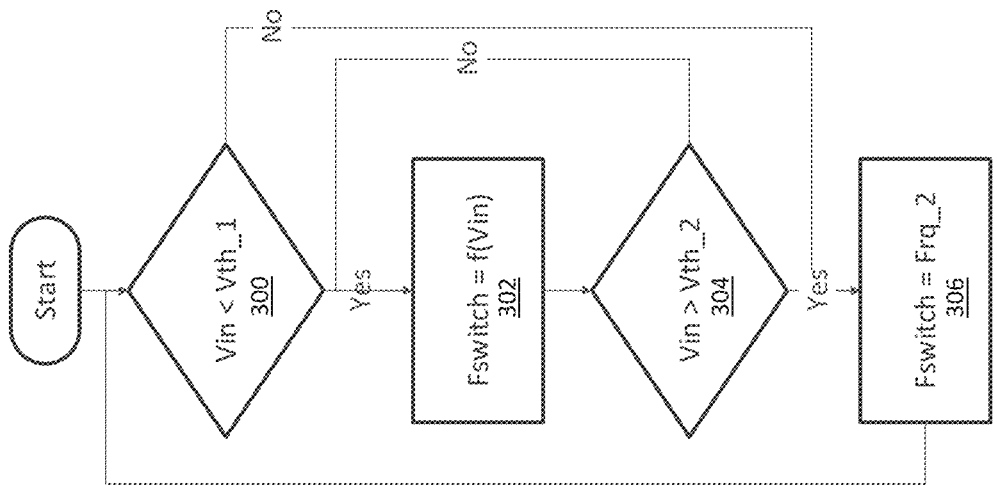
FIG. 12 illustrates an embodiment of the discrete PSFB switching frequency adjustment method implemented by the controller of the PSFB converter.

FIG. 12 illustrates an embodiment of the control method implemented by the PSFB controller 116 for carrying out Trajectory B in FIG. 10, i.e., discrete Fswitch adjustment. According to this embodiment, the controller 116 compares the input voltage Vin or an estimate of the input voltage Vin to the first voltage threshold Vth_1 (Block 300). If the input voltage Vin or estimate thereof is below the first voltage threshold Vth_1, the controller 116 lowers the frequency Fswitch at which the legs $Q_A/Q_B$, $Q_C/Q_D$ of full bridge switch devices $Q_A$, $Q_B$, $Q_C$, $Q_D$ are switched to a reduced discrete frequency Frq_1 (Block 302). As explained above, the legs $Q_A/Q_B$, $Q_C/Q_D$ of the full bridge 112 are switched out of phase to transfer energy from the primary side of the PSFB converter 104 to the secondary side. The PSFB switching frequency Fswitch remains set at the reduced discrete frequency Frq_1 if the input voltage Vin remains below a second threshold Vth_2 (Block 304). If the input voltage Vin rises above the second threshold Vth_2, the controller 116 sets Fsw to a higher discrete frequency Frq_2 (Block 306). The controller 116 maintains Fsw=Frq_2 until the input voltage Vin once again drops below the first threshold Vth_1 (Block 300). In some cases, Vth_1 may equal Vth_2 with hysteresis to avoid.

The switching frequency adjustment implemented by the PSFB controller 116 may follow some other trajectory based on the frequency-input voltage relationship.

In the case of digital control, the controller 116 may be readily programmed via code to implement any of the Fswitch adjustment techniques described herein or any other trajectory based on the frequency-input voltage relationship of the PSFB converter 104. For example, for Trajectory A in FIG. 10 and the related method of FIG. 11, the controller 116 may implement continual Fswitch adjustment by acquiring information about the DC link voltage (Vin), e.g., by direct measurement, estimation, etc. Based on the DC link voltage information, the controller 116 performs linear modulation of the PSFB switching frequency Fswitch. For Trajectory B in FIG. 10 and the related method of FIG. 12, the controller 116 may implement discrete Fswitch adjustment by storing different Fswitch values, e.g., in a PWM (pulse width modulation) registry. If the PSFB input voltage Vin is less than some value, the controller 116 uses a reduced switching frequency Fswitch_min as the PSFB switching frequency. Otherwise, the controller 116 uses a maximum switching frequency Fswitch_max as the PSFB switching frequency. The controller 116 may base the Fswitch adjustment decision on a simple threshold comparison.

In the case of analog control, additional circuitry may be included in the PSFB converter system for providing PSFB switching frequency control based on input voltage. For example, the controller 116 may be a PI (proportional-integral) controller and Vin may be given by a resistor. The controller 116 may perform analog modulation based on Vin variation. The analog implementation depends on the specific type of analog controller.

Figure 13:
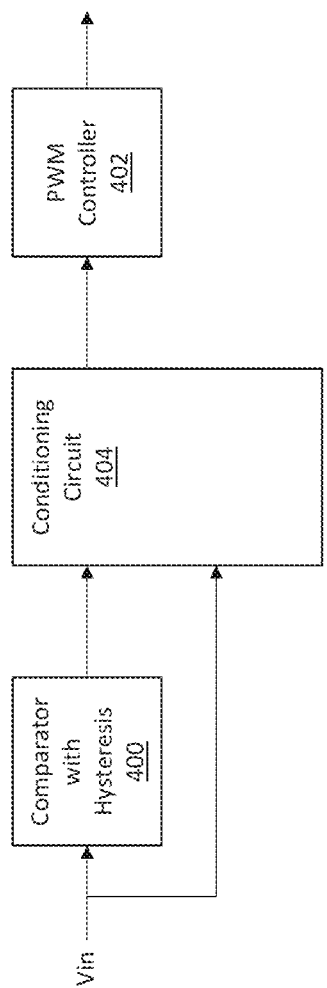
FIG. 13 illustrates an embodiment of an analog implementation of the continual PSFB switching frequency adjustment method implemented by the controller of the PSFB converter, with hysteresis.

FIG. 13 illustrates an embodiment of an analog implementation of the PSFB controller 116 for implementing the continual Fswitch Trajectory A in FIG. 10 and related method of FIG. 11. According to this embodiment, the controller 116 includes a hysteretic comparator 400 for indicating whether changes in the input voltage fall within a hysteresis window. The controller 116 also includes a PWM controller 402 with at least one frequency setting input and a conditioning circuit 404 for determining one of the frequency setting inputs of the PWM controller 402. If the input voltage Vin or estimate therefor falls within the hysteresis window, the conditioning circuit 404 sets the corresponding frequency setting input of the PWM controller 402 to a nominal (higher) frequency. Otherwise, the conditioning circuit 404 adjusts the corresponding frequency setting input of the PWM controller 402 as a function of the input voltage Vin so as to provide sufficient duty time under reduced input voltage conditions. The input voltage Vin or estimate thereof is an input to the conditioning circuit 404 according to this embodiment, so that the conditioning circuit 404 can adjust Fswitch as a function of Vin. The PWM controller 402 may have more than one frequency setting input, even though only one frequency setting input (from the conditioning circuit 404) is shown in FIG. 13.

Figure 14:
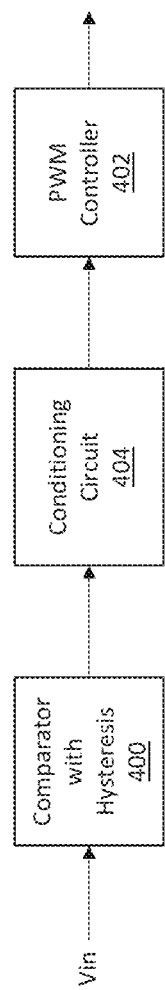
FIG. 14 illustrates an embodiment of an analog implementation of the discrete PSFB switching frequency adjustment method implemented by the controller of the PSFB converter, with hysteresis.

FIG. 14 illustrates an embodiment of an analog implementation of the PSFB controller 116 for implementing the discrete Fswitch Trajectory B in FIG. 10 and related method of FIG. 12. The embodiment in FIG. 14 is similar to the embodiment in FIG. 13. However, the implementation of the conditioning circuit 404 is simpler in FIG. 14 since the controller 116 makes discrete adjustments to Fswitch instead of continual adjustments. As in FIG. 13, the hysteretic comparator 400 indicates whether changes in the input voltage Vin fall within a hysteresis window. If the input voltage Vin or estimate thereof falls within the hysteresis window, the conditioning circuit 404 sets the corresponding frequency setting input of the PWM controller 402 to the nominal (higher) frequency. Otherwise, the conditioning circuit 404 sets the corresponding frequency setting input of the PWM controller 402 to a reduced (discrete) frequency which provides sufficient duty time under reduced input voltage conditions. The input voltage Vin or estimate thereof is not an input to the conditioning circuit 402 in FIG. 14, since the conditioning circuit 404 makes discrete adjustments to Fswitch in this embodiment.

The PSFB switching frequency control techniques described herein allow for designing a PSFB converter having optimal performance at nominal conditions while fulfilling specifications for hold up time during reduced input voltage conditions. By employing these PSFB switching frequency control techniques, the external resonant inductance Lr of the PSFB converter 104 and the leakage inductance Llkg of the isolation transformer 110 can be increased up to zero freewheeling time at the maximum possible load at nominal input voltage and/or the turn ratio of the transformer 110 can be modified for a longer duty and lower secondary reflected voltage. The PSFB switching frequency control techniques described herein maximize ZVS range for the full bridge 112 while reducing switching losses at light load, reduce magnetizing current since Lr, Llkg can provide more energy for the transitions and thereby reduce conduction losses, minimize freewheeling time which lowers circulating current in primary side and therefore reduces conduction losses, and maximize effective duty which lowers the secondary side reflected voltage and allows for the use of better secondary side voltage class switch devices.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A phase shift full bridge (PSFB) converter, comprising:
an isolation transformer having a primary side and a secondary side;
a full-bridge comprising a first pair of switch devices connected in series at a first node coupled to a first terminal of the primary side of the isolation transformer, and a second pair of switch devices connected in series at a second node coupled to a second terminal of the primary side of the isolation transformer;
a rectifier coupled to the secondary side of the isolation transformer; and
a controller operable to switch the first and the second pairs of switch devices out of phase with each other,
wherein under nominal input voltage conditions for the PSFB, the controller is operable to switch the first and the second pairs of switch devices at a nominal switching frequency,
wherein under reduced input voltage conditions for the PSFB, the controller is operable to switch the first and the second pairs of switch devices at a frequency lower than the nominal switching frequency,
wherein during a power transfer cycle, a leading leg transition occurs before a power transfer from the primary side to the secondary side and after a freewheeling phase, and a lagging leg transition occurs after the power transfer from the primary side to the secondary side,
wherein during the leading leg transition, one switch device of the second pair of switch devices has turned off,
wherein during the lagging leg transition, one switch device of the first pair of switch devices has turned off,
wherein no power transfer occurs during the freewheeling phase,
wherein the freewheeling phase is minimized under the nominal input voltage conditions,
wherein the freewheeling phase is maintained greater than zero under the reduced input voltage conditions, the freewheeling phase being related to the frequency at which the first and the second pairs of switch devices are switched.

2. The PSFB of claim 1, wherein under the reduced input voltage conditions, the controller is operable to continually adjust the frequency at which the first and the second pairs of switch devices are switched based on input voltage to the PSFB.

3. The PSFB of claim 2, wherein the controller is operable to compare the input voltage or an estimate of the input voltage to a voltage threshold and continually adjust the frequency at which the first and the second pairs of switch devices are switched if the input voltage or the estimate of the input voltage is below the voltage threshold.

4. The PSFB of claim 3, wherein the controller comprises a comparator with hysteresis and configured to indicate when the input voltage or the estimate of the input voltage drops below the voltage threshold.

5. The PSFB of claim 2, wherein under the reduced input voltage conditions, the controller is operable to linearly adjust the frequency at which the first and the second pairs of switch devices are switched based on the input voltage.

6. The PSFB of claim 1, wherein the controller is operable to switch the first and the second pairs of switch devices at a first discrete frequency under the nominal input voltage conditions and switch the first and the second pairs of switch devices at a second discrete frequency lower than the first discrete frequency under the reduced input voltage conditions.

7. The PSFB of claim 6, wherein the controller is operable to compare the input voltage or an estimate of the input voltage to a voltage threshold and change the frequency at which the first and the second pairs of switch devices are switched from the first discrete frequency to the second discrete frequency if the input voltage or the estimate of the input voltage is below the voltage threshold.

8. The PSFB of claim 7, wherein the controller is operable to change the frequency at which the first and the second pairs of switch devices are switched from the second discrete frequency back to the first discrete frequency if the input voltage or the estimate of the input voltage increases above the voltage threshold.

9. The PSFB of claim 7, wherein the controller comprises a comparator with hysteresis and configured to indicate when the input voltage or the estimate of the input voltage drops below the voltage threshold.

10. The PSFB of claim 1, wherein the controller is operable to switch the first and the second pairs of switch devices at a frequency lower than the nominal switching frequency during interruptions in an AC line voltage input which powers the PSFB.

11. A method of operating a phase shift full bridge (PSFB) converter that includes an isolation transformer having a primary side and a secondary side, a full-bridge having a first pair of switch devices connected in series at a first node coupled to a first terminal of the primary side of the isolation transformer and a second pair of switch devices connected in series at a second node coupled to a second terminal of the primary side of the isolation transformer, and a rectifier coupled to the secondary side of the isolation transformer, the method comprising:
  switching the first and the second pairs of switch devices out of phase with each other;
  under nominal input voltage conditions for the PSFB, switching the first and the second pairs of switch devices at a nominal switching frequency;
  under reduced input voltage conditions for the PSFB, switching the first and the second pairs of switch devices at a frequency lower than the nominal switching frequency;
  during a power transfer cycle, implementing a leading leg transition before a power transfer from the primary side to the secondary side and after a freewheeling phase, and implementing a lagging leg transition after the power transfer from the primary side to the secondary side, wherein no power transfer occurs during the freewheeling phase;
  during the leading leg transition, turning off one switch device of the second pair of switch devices;
  during the lagging leg transition, turning off one switch device of the first pair of switch devices;
  minimizing the freewheeling phase under the nominal input voltage conditions; and
  maintaining the freewheeling phase greater than zero under the reduced input voltage conditions, the freewheeling phase being related to the frequency at which the first and the second pairs of switch devices are switched.

12. The method of claim 11, wherein switching the first and the second pairs of switch devices at a frequency lower than the nominal switching frequency comprises continually adjusting the frequency at which the first and the second pairs of switch devices are switched based on input voltage to the PSFB.

13. The method of claim 12, wherein continually adjusting the frequency at which the first and the second pairs of switch devices are switched based on the input voltage comprises:
  comparing the input voltage or an estimate of the input voltage to a voltage threshold; and
  continually adjusting the frequency at which the first and the second pairs of switch devices are switched if the input voltage or the estimate of the input voltage is below the voltage threshold.

14. The method of claim 13, wherein the input voltage or the estimate of the input voltage is compared to the voltage threshold with hysteresis to indicate when the input voltage or the estimate of the input voltage drops below the voltage threshold.

15. The method of claim 12, wherein continually adjusting the frequency at which the first and the second pairs of switch devices are switched based on the input voltage comprises linearly adjusting the frequency at which the first and the second pairs of switch devices are switched based on the input voltage.

16. The method of claim 11, wherein switching the first and the second pairs of switch devices at a nominal switching frequency under the nominal input voltage conditions comprises switching the first and the second pairs of switch devices at a first discrete frequency, and wherein switching the first and the second pairs of switch devices at a frequency lower than the nominal switching frequency under the reduced input voltage conditions comprises switching the first and the second pairs of switch devices at a second discrete frequency lower than the first discrete frequency.

17. The method of claim 16, wherein switching the first and the second pairs of switch devices at the second discrete frequency under the reduced input voltage conditions comprises:
  comparing the input voltage or an estimate of the input voltage to a voltage threshold; and
  changing the frequency at which the first and the second pairs of switch devices are switched from the first discrete frequency to the second discrete frequency if the input voltage or the estimate of the input voltage is below the voltage threshold.

18. The method of claim 17, further comprising changing the frequency at which the first and the second pairs of switch devices are switched from the second discrete frequency back to the first discrete frequency if the input voltage or the estimate of the input voltage increases above the voltage threshold.

19. The method of claim 17, wherein the input voltage or the estimate of the input voltage is compared to the voltage threshold with hysteresis to indicate when the input voltage or the estimate of the input voltage drops below the voltage threshold.

20. The method of claim 11, wherein switching the first and the second pairs of switch devices at a frequency lower than the nominal switching frequency under reduced input voltage conditions for the PSFB comprises switching the first and the second pairs of switch devices at a frequency lower than the nominal switching frequency during interruptions in an AC line voltage input which powers the PSFB.

21. An AC/DC converter, comprising:
an AC/DC stage configured to convert an AC line voltage to a DC voltage; and
a phase shift full bridge (PSFB) converter coupled to the AC/DC stage and comprising:
an isolation transformer having a primary side and a secondary side;
a full-bridge comprising a first pair of switch devices connected in series at a first node coupled to a first terminal of the primary side of the isolation transformer, and a second pair of switch devices connected in series at a second node coupled to a second terminal of the primary side of the isolation transformer;
a rectifier coupled to the secondary side of the isolation transformer; and
a controller operable to switch the first and second pairs of switch devices out of phase with each other,
wherein under nominal AC line voltage conditions, the controller is operable to switch the first and the second pairs of switch devices at a nominal switching frequency,
wherein under reduced AC line voltage conditions, the controller is operable to switch the first and the second pairs of switch devices at a frequency lower than the nominal switching frequency,
wherein during a power transfer cycle, a leading leg transition occurs before a power transfer from the primary side to the secondary side and after a freewheeling phase, and a lagging leg transition occurs after the power transfer from the primary side to the secondary side,
wherein no power transfer occurs during the freewheeling phase,
wherein during the leading leg transition, one switch device of the second pair of switch devices has turned off,
wherein during the lagging leg transition, one switch device of the first pair of switch devices has turned off,
wherein the freewheeling phase is minimized under the nominal input voltage conditions,
wherein the freewheeling phase is maintained greater than zero under the reduced input voltage conditions, the freewheeling phase being related to the frequency at which the first and the second pairs of switch devices are switched.

22. The AC/DC converter of claim 21, wherein under the reduced input voltage conditions, the controller of the PSFB is operable to continually adjust the frequency at which the first and the second pairs of switch devices are switched based on input voltage to the PSFB.

23. The AC/DC converter of claim 21, wherein the controller of the PSFB is operable to switch the first and the second pairs of switch devices at a first discrete frequency under the nominal input voltage conditions and switch the first and the second pairs of switch devices at a second discrete frequency lower than the first discrete frequency under the reduced input voltage conditions.

* * * * *